United States Patent [19]

Starner

[11] Patent Number: 5,426,169

[45] Date of Patent: Jun. 20, 1995

[54] FLEXIBLIZED POLYEPOXIDE RESINS INCORPORATING ALIPHATIC DIGLYCIDYL ETHERS

[75] Inventor: William E. Starner, Nesquehoning, Pa.

[73] Assignee: Air Products and Chemicals, Inc., Allentown, Pa.

[21] Appl. No.: 146,272

[22] Filed: Nov. 2, 1993

[51] Int. Cl.6 .................... C08G 59/00; C08G 65/08; C08G 65/14
[52] U.S. Cl. .................................... 528/103; 525/524
[58] Field of Search ........................................ 528/103

[56] References Cited

U.S. PATENT DOCUMENTS

| | | | |
|---|---|---|---|
| 2,528,932 | 11/1950 | Wiles, et al. | 106/287 |
| 3,299,169 | 1/1967 | Smith | 260/830 |
| 3,316,323 | 4/1967 | Wille et al. | 260/830 |
| 3,567,677 | 3/1971 | Webb et al. | 260/37 |
| 4,277,390 | 7/1981 | Kulier et al. | 260/37 EP |
| 4,552,814 | 11/1985 | Cavitt et al. | 428/414 |
| 4,608,313 | 8/1986 | Hickner et al. | 428/414 |

OTHER PUBLICATIONS

Lee and Neville, "Handbook of Epoxy Resins", pp. 16-2, 16-3, Copyright 1967, McGraw-Hill Inc.

Primary Examiner—Frederick Krass
Attorney, Agent, or Firm—Russell L. Brewer; Mary E. Bongiorno

[57] ABSTRACT

This invention relates to improved polyepoxide resins having enhanced physical and elastic properties. The polyepoxide resins comprise a polyepoxide resin based on a polyglycidyl ether of a phenolic-type compound and an amine curing agent. The improvement in the polyepoxide resin formulation comprises incorporating an aliphatic, aliphatic ether or ester component having monofunctional reactivity with an amine hydrogen, an amine curative having from 3 to 10, and preferably 3 to 5 epoxide reactive hydrogen atoms into the epoxy resin, and a diglycidyl ether of a polyalkyleneoxide. The presence of the monofunctional and aliphatic amine reactive component along with the diglycidyl ether of a polyalkyleneoxide results in an epoxy resin having enhanced properties.

7 Claims, No Drawings

FLEXIBLIZED POLYEPOXIDE RESINS INCORPORATING ALIPHATIC DIGLYCIDYL ETHERS

FIELD OF THE INVENTION

This invention pertains to epoxy resins having enhanced flexibility and elongation.

BACKGROUND OF THE INVENTION

Civil engineering and industrial coating industries require economical, environmentally safe resin systems which cure at ambient temperature and give good elastomeric properties without compromising the moisture and chemical resistance. Concrete structures, for example, require coatings which are able to withstand impact as well as cover shrinkage-induced cracks which may be present therein.

Aromatic polyepoxide resins, particularly those based upon the use of polyglycidyl ethers of bisphenol A, have widely been used for preparing cast resins and coatings for civil engineering applications. Some of the reasons for success of epoxy resins in these applications due to their moisture and chemical resistance as well as their ability to bond to a variety of substrates. When the polyepoxide resins are cured with polyamides, the resins, although resistant to chemicals, generally lack elasticity for a multitude of applications and when cured with amines, the polyepoxide resins lose their flexibility and impact strength.

Historically, flexibility in an epoxy resin formulation has been obtained through the use of coal tar or similar additives. Flexibility has also been imparted to an ambient cured epoxy by making gross changes in the cured epoxy structure. These changes typically have been accomplished by the following methods: (1) modifying the aromatic character to a more aliphatic character; (2) reducing the crosslink density by using a curative with lower functionality or using a high excess of curative; and (3) adding long chain modifiers or flexibilizers in the form of resin, curative, or reactive additive. To achieve flexibilization of the epoxy resin pursuant to method 3, often flexibilizers in excess of sixty percent by weight of the formulation may be required or plasticizers such as nonylphenol or benzyl alcohol may be used to reduce the concentration of flexibilizer. The use of plasticizers leads, of course, to the presence of fugitive materials.

Representative patents which describe polyepoxide resins and the approach to enhancing the physical properties of the polyepoxide resins are as follows:

U.S. Pat. No. 3,316,323 discloses the preparation of bisphenol A type epoxy molded articles having improved flexibility and reduced water absorption which incorporate an outer softening agent such as phthalic acid ester or an adipic acid ester. Inner softening of the epoxy resin is achieved by incorporating the addition of aliphatic polyetheralcoholdiglycidyl ethers, e.g., polyethyleneglycoldiglycidyl ether where the polyethyleneglycoldiglycidyl ether carbon atoms in the α and α' positions are substituted with an alkyl, an alkylene, aralkyl or aryl side chain. By incorporating the hydrocarbon substituent on the α and α' carbon atom, reduced water absorption values are obtained.

U.S. Pat. No. 3,567,677 discloses the preparation of epoxide pottable encapsulated electrical connectors having high flexibility. The compositions comprise diglycidyl ethers of bisphenol A, diepoxides of a polyglycol, and at least one amine curing agent. Formulations include diglycidyl ethers of bisphenol A, diepoxides of polyglycols and amine curatives, including amine curatives adducted with phenylglycidyl ether in a 1:1 molar ratio.

U.S. Pat. No. 4,608,313 discloses epoxy resins crosslinked with polyisocyanates which are resistant to chipping by stone. Aliphatic diepoxides and aromatic diepoxides are utilized in the stone resistant epoxy formulations with the aliphatic diepoxides being glycidyl ethers of polyoxyalkylene glycols generated by reacting an aliphatic initiator with propylene oxide or butylene oxide.

U.S. Pat. No. 4,552,814 discloses chip-resistant epoxy resins particularly adapted for protective coatings on automobiles. The formulations incorporate polyglycidyl ethers of compounds having aliphatic hydroxyl groups such as glycidyl ethers of ethylene and propylene glycol as well as the glycidyl ethers of polyoxypropylene and polyoxyethylene glycol.

U.S. Pat. No. 3,299,169 discloses epoxy resins having improved flexibility while retaining good tensile strength comprising glycidyl ethers of bisphenol A, a diglycidyl ether a polyglycol and a polyoxyalkylenediamine curing agent.

U.S. Pat. No. 4,277,390 discloses high molecular weight polyepoxides which have high impact strength, good heat resistance, chemical stability, as well as high elasticity and low brittleness. The patentees' combine (polypropylene glycol)diurethanediepoxide with the polyglycidyl ethers of bisphenol A and curing with an amine curing agent, e.g., methylene dianiline.

U.S. Pat. No. 2,528,932 discloses polyepoxide resins having enhanced spreadability or fluid characteristics when utilized as an adhesive. To enhance the fluidizing property of the polyepoxide resin, a normally liquid, substantially nonvolatile mono-epoxy compound is incorporated into the formulation. Examples include glycidyl ethers of polyhydric phenols as the resinifying constituent and representative mono-epoxy compounds include glycidylphenyl ether, styrene oxide and β-methyl-glycidol.

SUMMARY OF THE INVENTION

This invention relates to improved polyepoxide resins having enhanced flexible and elastic properties. The polyepoxide resins comprise an polyepoxide resin based on a polyglycidyl ether of a phenol cured with an amine curative having at least 3 to 10, and preferably 3 to 4 epoxide reactive hydrogen atoms. The improvement in the polyepoxide resin formulation comprises incorporating an aliphatic, aliphatic ether or ester component having monofunctional reactivity with an amine hydrogen and a diglycidyl ether of polyalkyleneoxide. There are several advantages associated with the cured polyepoxide resin of this invention and these advantages include:

- an ability to produce a product having excellent chemical and moisture resistance which is well suited for civil engineering and industrial coating applications;
- an ability to produce a product polyepoxide resin having excellent flexibility and impact strength;
- an ability to produce a product polyepoxide resin, while having a high degree of elongation or elasticity with reduced levels of flexibilizer;

an ability to formulate a cured polyepoxide resin which has low volatile organic content (VOC), thus minimizing environmental dangers associated with many flexibilized polyepoxide resin systems; and, an ability to form environmentally safe polyepoxide resins which will cure at ambient temperature and yet have good elastomeric properties without compromising moisture and chemical resistance.

DETAILED DESCRIPTION OF THE INVENTION

In producing a formulation for the curable polyepoxide resin, a recommended formulation for producing the flexibilized polyepoxide resin is as follows: '1. Polyglycidyl ether of an aromatic alcohol, i.e., a phenol type component —40 to 100 parts by weight;
2. Monofunctional and aliphatic, aliphatic ether or ester amine reactive component —10 to 40 parts by weight;
3. Diglycidyl ether of a polyalkyleneoxide —10 to 40 parts by weight;
4. Aliphatic amine curative having from 3 to 10 epoxide reactive hydrogen atoms —0.6 to 1.5, preferably 0.9 to 1.1 equivalents amine hydrogen per equivalent of amine hydrogen reactive component present in components 1, 2 and 3 above.

Only through a selected combination of four key ingredients, (1) polyglycidyl ether of a phenol type compound; (2) monofunctional and aliphatic, aliphatic ether or ester amine reactive component (3) diglycidyl ether of a polyalkylene oxide glycol as a flexibilizing additive, and (4) an amine curative having at least 3 epoxide reactive hydrogen atoms, can the highly elastomeric epoxy resins having the excellent physical properties be generated.

The polyepoxide useful for practicing the present invention are those polyglycidyl ethers of phenolic type compounds having terminal 1,2-epoxy groups. The epoxide equilvalents of these glycidyl ethers is greater than one and the equivalent weight ranges from 150 to 1000. Polyglycidylethers of diphenylol propane or bisphenol A are particularly suited as polyepoxides for the production of coatings and resin products for civil engineering applications. Others include polyglycidyl ethers of phenol/formaldehyde and bisphenol/formaldehyde novolacs as well as the polyglycidyl ethers of tri(hydroxyphenyl)methane and tetra(hydroxyphenyl) ethanes and propanes.

The monofunctional and aliphatic amine reactive component used in the polyepoxide formulation is an aliphatic component having an amine hydrogen reactive substituent. The aliphatic component is monofunctional in that it reacts only with a single hydrogen of the amine group and thus, it is a chain blocking agent, as opposed to a crosslinking agent, thus reducing the level of crosslinks in the final polyepoxy resin product. The amine hydrogen reactive substituent of the monofunctional and aliphatic amine reactive component can be virtually any substituent which is reactive with an amine hydrogen atom present in the amine curative. Typically the monofunctional and aliphatic amine reactive component used in forming the polyepoxide resin is a monofunctional epoxide or monofunctional acrylate. Also, monofunctional aliphatic isocyanates may be used. Examples of monofunctional epoxides include the glycidyl ethers of the aliphatic alcohols, such as, butyl, pentyl, hexyl, 2-ethylhexyl, octyl, nonyl and $C_{12}$ to $C_{14}$ alkanols. Of these the glycidyl ether of $C_{12}$ to $C_{14}$ alkanols is preferred. Examples of monofunctional acrylates which also can be utilized include the $C_1$ to $C_8$ alkyl esters of acrylic and methacrylic acid an these include methylmethacrylate, ethylacrylate, 2-ethylhexylacrylate, butyl acrylate or the corresponding methacrylates. Examples of monofunctional aliphatic isocyanates include hexamethyleneisocyanate, ethylhexylisocyanate, and the like.

The flexibilizing component of the polyepoxide resin product is based upon a diglycidyl ether of a polyalkylene oxide or glycol such as those described in U.S. Pat. Nos. 3,316,323; 4,552,814 and 3,299,169, these patents being incorporated by reference. The diglycidyl ether of the polyalkylene oxide or glycol comprises the reaction product of epichlorohydrin and a polyalkylene glycol, such as the ethylene and propyleneoxide adducts of $C_2$ to $C_4$ polyols. For enhanced flexibilization of the polyepoxide resin, the molecular weight of the polyol should range from about 400 to 3000, preferably 1000 to 2000. Higher molecular weight glycols tend to cause phase separation in the formulated epoxy leading to poor physical properties.

The aliphatic amine curative for forming the cured polyepoxide resin product is one having a plurality of amino hydrogen atoms, e.g., 3 to 10, and preferably 3 to 4, hydrogen atoms which are reactive with epoxide groups and the unsaturated groups of the acrylate terminated polyurethanes. Amine curatives having a higher proportion of hydrogen atoms and approaching the upper end of the above recited range tend to effect greater crosslinking than do amine curatives having lesser hydrogen atoms and the resulting epoxide products tend to be more rigid and exhibit lesser levels of elongation than do the polyepoxide resins cured with amine curatives having the lower levels within the middle of the range of amine hydrogen atoms. Typically, the amine curative will have from about 3 to 4 reactive hydrogen atoms and a molecular weight ranging from about 70 to 250. Examples of amine curatives include aminoethyl piperazine; N-methylethylenediamine; bis(-para-aminocyclohexyl)methane (PACM); isophorone diamine, ethylenediamine and polyethylenepolyamines such as triethylenetetramine, tetraethylenepentamine, pentaethylenehexamine; polyamidoamines based on fatty acid adducts of polyethylenepolyamines and so forth. Generally, any aliphatic or cycloaliphatic amine compound known to be an epoxy curative may be used in this invention. The preferred curatives are 1-(2-aminoethyl)piperazine (AEP); bis(para-aminocyclohexyl)methane (PACM), and isophoronediamine (IPD).

Several observations regarding formulation of the polyepoxide resin have been made that are valuable in determining the ultimate type of product desired. For example, the greater the amount of flexibilizer and/or monofunctional epoxide or acrylate the higher the percent elongation in the final product. The absence of flexibilizer results in an ambient cured epoxy with less than 15% elongation. If the monofunctional amine reactive component is absent, the level of flexibilizer generally must be increased to at least 70% of the formulation in order to produce an ambient cured epoxy with elongations of from 50 to 200%. The presence of the monofunctional epoxide or acrylate reduces the level of flexibilizing agent needed to as low as 20% while still maintaining good elongation properties, while the absence of monofunctional epoxide or acrylate leads to high viscosity and elongations of less than 15%. The amine curative, and its functionality, (the number of active hydrogens present in the amine curative) generally determines the level of flexibilizer and/or monofunctional epoxide or acrylate needed to obtain a given elongation. As the functionality of the curative is lowered, crosslinking is reduced and therefore the amount of flexibilizer and/or monofunctional epoxide or acrylate may be reduced to obtain a specified percent elongation.

The range of components based on one hundred twenty parts by weight of resin forming components, i.e., polyglycidyl ether of phenol, monofunctional and aliphatic amine reactive component, and acrylate terminated urethane prepolymer, excluding the amine curative, is from about 40 to 100, preferably about 50 to 70 parts by weight of polyglycidyl ether of a phenol; 10 to 40 parts of the monofunctional amine reactive component; and 10 to 40 parts of the diglycidylether of a polyalkyleneoxide or glycol. The level of amine curative component is largely dependent upon the physical properties desired. In many cases, a stoichiometric level, based on the equivalents epoxide in the polyglycidyl ether of phenol type compound, the monofunctional amine reactive compound and equivalents diglycidyletherpolyalkylene oxide (the resin forming components) may not be utilized. Generally, though, the amine curative is incorporated at a level to provide from 0.6 to 1.5, preferably 0.9 to 1.1, equivalents active amine hydrogen atoms per equivalent of the resin forming components. In the preferred embodiments, a polyglycidyl ether of bisphenol A having an equivalent weight from 150 to 250, a glycidyl ether of a $C_{12-14}$ alcohol; a diglycidylether of a polyalkylene oxide having an equivalent weight of from 600 to 1800 is used and the amine curative is incorporated at a level capable of reaction with 0.9 to 1.1 equivalents amine hydrogen based on those equivalents in the resin forming components.

To summarize, the physical properties and particularly the degree of elasticity is generally dependent upon the ratio of flexibilizer and monofunctional epoxide or acrylate. Although the functionality of the amine curative determined by the number of active hydrogens present is a factor, control of elasticity is primarily maintained via the monofunctional amine reactive component. The flexibilizing additive supplies the soft or rubbery segment providing the for desired elasticity. The monofunctional epoxide or acrylate acts as a capping agent reducing the amount of crosslinking through the amine curative and as the degree of crosslinking is reduced, the elasticity of the cured epoxy is increased. The amount of crosslinking may also be controlled through the amine curative functionality. Amines with high levels of available hydrogens for crosslinking generate less elastic epoxies.

The following examples are provided to illustrate various embodiments of the invention and are not intended to restrict the scope thereof. All parts or parts by weight or percentages are expressed as weight percentages unless otherwise specified.

EXAMPLE 1

PREPARATION OF CURED EPOXY TEST SPECIMENS EFFECT OF AMINE CURATIVE

The elastomeric epoxy is prepared by thoroughly mixing the flexibilizer, monofunctional and aliphatic amine reactive component and epoxy resin. After degassing at 10 mm Hg, an equivalent amount of amine curative based on the number of available active hydrogens is added to the resin and mixed thoroughly. The resulting solution is allowed to cure at ambient temperature for seven days in the desired mold shape. The test specimens are die cut and the tensile properties determined according to the ASTM D-638 protocol. Table 1 shows the reactants and effect on the physical properties of the polyepoxide resin cured with triethylene tetramine (TETA).

TABLE 1
EFFECT OF CURATIVE ON PHYSICAL PROPERTIES

| COMPOUND | Runs | | |
|---|---|---|---|
| | 1 | 2 | 3 |
| EPON 828 | 70 | 70 | 70 |
| EPODIL 748 | 0 | 20 | 20 |
| DER 732 | 30 | 30 | 0 |
| TETA | 11.2 | 12.9 | 10.6 |
| SHORE D | 85 | 65 | 85 |
| TENSILE STRENGTH (PSI) | 6500 | 2252 | 9000 |
| ELONGATION (%) | 6.3 | 42.8 | 3.0 |

Epon 828 is the digylcidyl ether of bisphenol A.
Epodil 748 is the monoglycidyl ether of a $C_{12-14}$ alkanol.
DER 732 is the diglycidyl ether of polypropyleneoxide.
TETA is triethylenetetramine.

Table 1 shows the effect of the DER 732 flexibilizer and monofunctional epoxide, EPODIL 748, on the elasticity of the formulated epoxy resin cured with TETA. Table 1 also shows that the absence of either flexibilizer (Run 3) or monofunctional amine reactive epoxide (Run 1) yields an epoxy with very low percent elongation relative to the other formulation. When both the flexibilizer and monofunctional epoxide are present, the percent elongation is improved.

What is claimed is:

1. In a curable epoxy resin comprising a polyglycidyl ether of a phenol having terminal 1,2-epoxy groups, the improvement for enhancing elasticity of the epoxy resin which comprises, in combination therewith:
    a monofunctional amine-reactive component,
    a diglycidyl ether of a polyalkylene oxide and an amine curative having from 3 to 10 epoxide reactive hydrogen atoms,
    wherein the resin, based on a total of 120 parts by weight, comprises:
    (a) from 40 to 100 parts by weight of the polyglycidyl ether of a phenol wherein the polyglycidyl ether of a phenol is a diglycidyl ether of a phenol having an epoxide equivalent weight range of from about 150 to 1000;
    (b) from 10 to 40 parts by weight of the monofunctional amine-reactive component wherein the monofunctional amine-reactive component is a monoglycidyl ether of a $C_{12}$ to $C_{14}$ alkanol;
    (c) from 10 to 40 parts by weight of the diglycidyl ether of a polyalkylene oxide having a molecular weight range from about 400 to 3000; and
    (d) an amount of the amine curative providing from about 0.6 to 1.5 equivalents of amine hydrogen per equivalent of amine hydrogen reactive group in components (a), (b) and (c).

2. The epoxy resin of claim 1 wherein the diglycidyl ether of a phenol is selected from the group consisting of a diglycidyl ether of bisphenol A and a diglycidyl ether of bisphenol F.

3. The epoxy resin of claim 1 wherein the aliphatic amine curative is selected from the group consisting of aminoethyl piperazine, bis(para-aminocyclohexyl)methane, N-methylethylenediamine, isophorone diamine, ethylenediamine, triethylenetetramine, tetraethylenepentamine and pentaethylenehexamine.

4. The epoxy resin of claim 3 wherein the diglycidyl ether of a polyalkyleneoxide is the diglycidyl ether of polypropyleneoxide.

5. The epoxy resin of claim 4 wherein the ratio of reactive amino hydrogen atoms to amine hydrogen reactive groups is from 0.9 to 1.1.

6. The epoxy resin of claim 5 wherein the amine curative has a molecular weight of from 70 to 250.

7. The epoxy resin of claim 6 wherein the aliphatic amine curative is a polyethylene polyamine selected from the group consisting of triethylene tetramine and tetraethylene pentamine.

* * * * *